United States Patent [19]

Clavier

[11] Patent Number: 4,913,212
[45] Date of Patent: Apr. 3, 1990

[54] VEHICLE WINDOW SCREEN ASSEMBLY

[76] Inventor: Walter S. Clavier, 966 Sunset Ter., Dover, Del. 19901

[21] Appl. No.: 237,048

[22] Filed: Aug. 29, 1988

[51] Int. Cl.4 .................................................. E06B 3/32
[52] U.S. Cl. ..................................... 160/105; 160/371
[58] Field of Search ...................... 160/105, 104, 370.2, 160/371, DIG. 2; 296/146, 95.1, 24.1; 248/DIG. 9

[56] References Cited

U.S. PATENT DOCUMENTS

| | | | |
|---|---|---|---|
| 2,568,800 | 9/1951 | Galla | 160/DIG. 2 X |
| 2,869,634 | 1/1959 | Bourgoin | |
| 2,892,498 | 6/1959 | Lee | |
| 2,915,119 | 12/1959 | Cox | |
| 3,016,952 | 1/1962 | Shero | |
| 3,422,876 | 1/1969 | Fester | |
| 3,587,706 | 6/1971 | Widmer et al. | |
| 3,847,201 | 11/1974 | Kalish | |
| 4,127,156 | 11/1978 | Brandt | 160/371 X |
| 4,398,586 | 8/1983 | Hall | |
| 4,567,930 | 2/1986 | Fischer | 248/909 X |
| 4,653,562 | 3/1987 | Moss et al. | 160/370.2 X |
| 4,817,655 | 4/1989 | Brooks | 160/392 X |

*Primary Examiner*—Blair M. Johnson
*Attorney, Agent, or Firm*—Howson and Howson

[57] ABSTRACT

A window screen assembly for use in over-the-road trucks and other vehicles. A fine-meshed screen is mounted on a one-piece molded frame and lattice arrangement constructed of a very strong plastic. The assembly is adaptable to many window opening sizes by cropping excess width off one end in order for the assembly to slide into the door window tracks. The top edge of the windowpane holds the frame up against the top of the window opening. The top rear of the frame conforms to the rounded corner of the window opening, and the lower rear of the frame extends over the rounded corner of the windowpane.

6 Claims, 3 Drawing Sheets

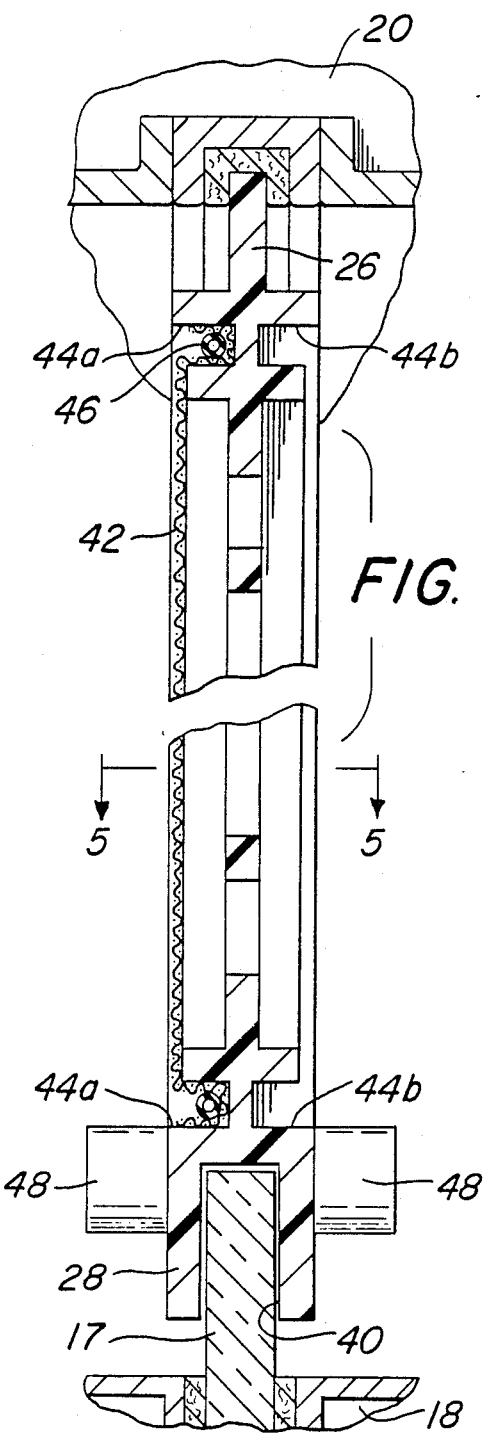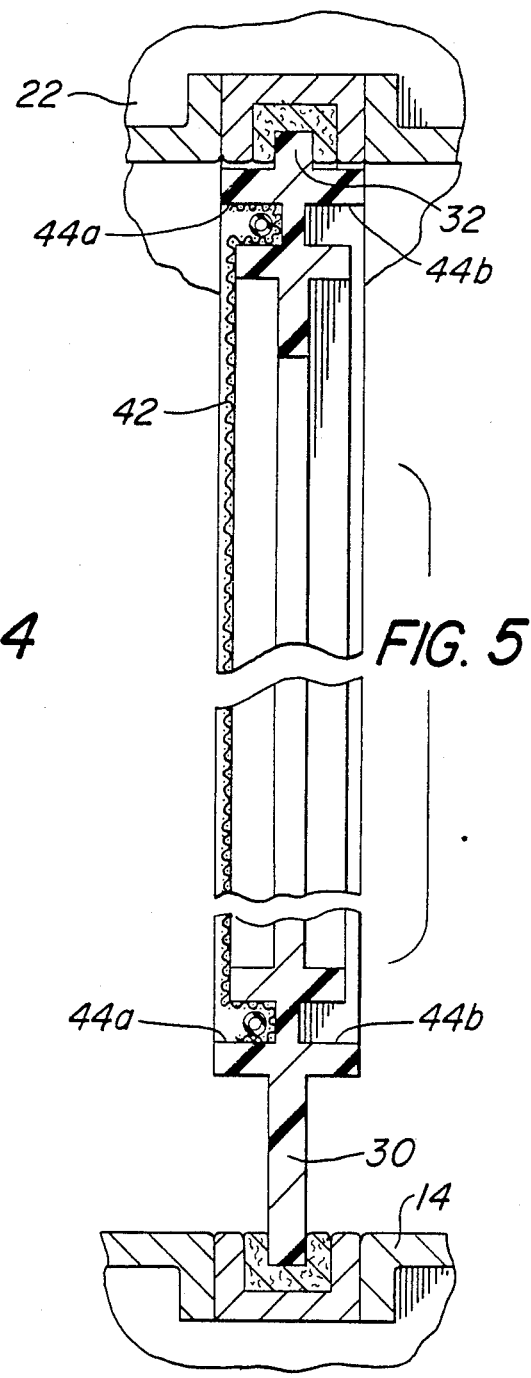

VEHICLE WINDOW SCREEN ASSEMBLY

The present invention relates generally to vehicle window screens, and more particularly to an improved window screen assembly adaptable to a wide variety of vehicles for security and insect-free ventilation.

Truck drivers on long hauls, especially over several days, will choose to stop for rest either in a motel or, at less cost, in their sleeper cab. Particularly in warm climates, the cost saving of the latter choice is often offset. In a parked, unairconditioned cab with open windows there is the annoyance of insects, reduced security against intruders, and a loss of the trucker's privacy. If the cab has an air conditioner allowing the windows to be closed, the fuel costs just to drive it with the truck's 300 to 400 hp Diesel engine is very costly. Some localities even prohibit truckers from running the engines over long rest periods at a truck stop to minimize air pollution. In addition, the noise and vibration of the engine might override any stealthy tampering with the cargo or fuel while the driver rests inside the cab.

Various configurations of screens have been used or proposed for easy installation in vehicle windows for ventilation and insect screening but they do not satisfy the above shortcomings. Such screens are usually custom-built for a window of a particular model of vehicle, are not adaptable to other window shapes and sizes, and are not adaptable to a corresponding window on the opposite side of the vehicle. Moreover, their construction provides relatively little sense of security against possible intruders. Those vehicle window screens of the prior art which offer some degree of personal security to the driver utilize locking devices that are either expensive, difficult to install, or adpatable to only a specific model of vehicle.

SUMMARY OF THE INVENTION

Accordingly, it is an object of the present invention to provide a screen assembly which is adaptable for use in a window opening on either side of a relatively large variety of vehicles, and which can be quickly and easily installed and removed with only use of the hands.

Another object is to provide a vehicle window screen assembly which affords ventilation and insect screening while maintaining greater personal privacy and security from intruders.

Still another object of the invention is to provide a versatile design which allows the component parts to be assembled for installation in like window openings on either side of the vehicle; and which is simple and inexpensive to manufacture.

These and other objects of the invention are accomplished by a novel vehicle window screen assembly of a fine-meshed screen secured around a one-piece molded frame and lattice arrangement constructed of a very strong, slightly flexible plastic. When in place, top, front and rear margins or so-called tenons of the frame fit into the tracks around the top and sides of the window opening, and the bottom fits over the top edge of the windowpane. The front tenon is of sufficient width for the assembly to fit a wide window but which can be cropped to fit a narrow window. In addition, the front tenon also includes several parallel lines as guides for cropping the width to fit a specific vehicle model. The frame is rounded at the to rear corner to conform approximately to the rounded corner in most vehicle window openings, and the the lower-near corner extends downward to engage the rounded corner of the wondowpane. The lattice comprised of diagonally crossed bars over the entire screen and vertical bars over the rear half of the screen provide a high degree of protection against intruders. The opposite sides of the frame include symmetrically opposite channels in which the screen many be secured for installing the assembly on either side of the vehicle.

Other objects, novel features and advantages of the invention will become more apparent from the following detailed description when considered in conjunction with the accompanying drawings wherein:

BRIEF DESCRIPTION OF THE DRAWINGS

FIG. 4 is a cross sectional view of the assembly taken along the vertical line 4-4 of FIG. 1;

FIG. 5 is a cross sectional view of the assembly taken along the line 5-5 of FIG. 4;

DESCRIPTION OF THE PREFERRED EMBODIMENT

Figure 1:
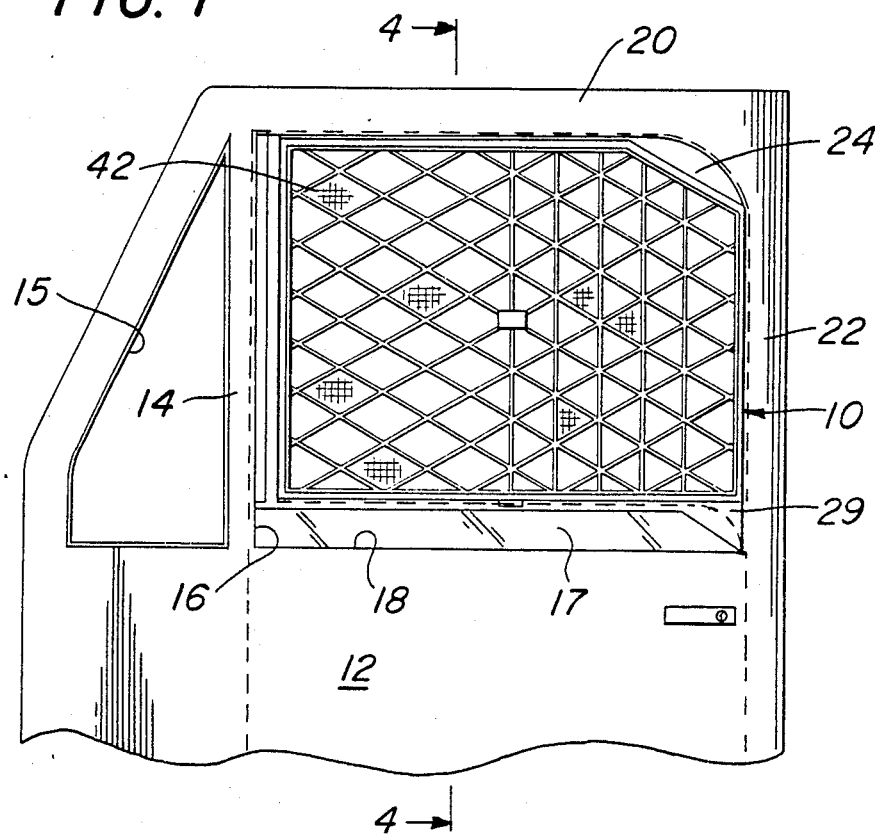
FIG. 1 is an elevation view of a window screen assembly according to the invention cropped at one end and installed in the left door of a truck cab.

Referring now to the drawings wherein like characters designate lke or corresponding parts throughout the several vies, there is shown in FIG. 1 an assembly 10 inserted in the window opening of a door 12 of a truck cab. The window is of conventional design and of the type divided by a vertical vent post 14 into a front or vent opening 15 and a rear or side opening 16. A windowpane 17, vertically movable in opening 16 through a slot in a window sill 18, is guided by tracks in post 14 and in top and rear door members 20 and 22, respectively.

Figure 2:
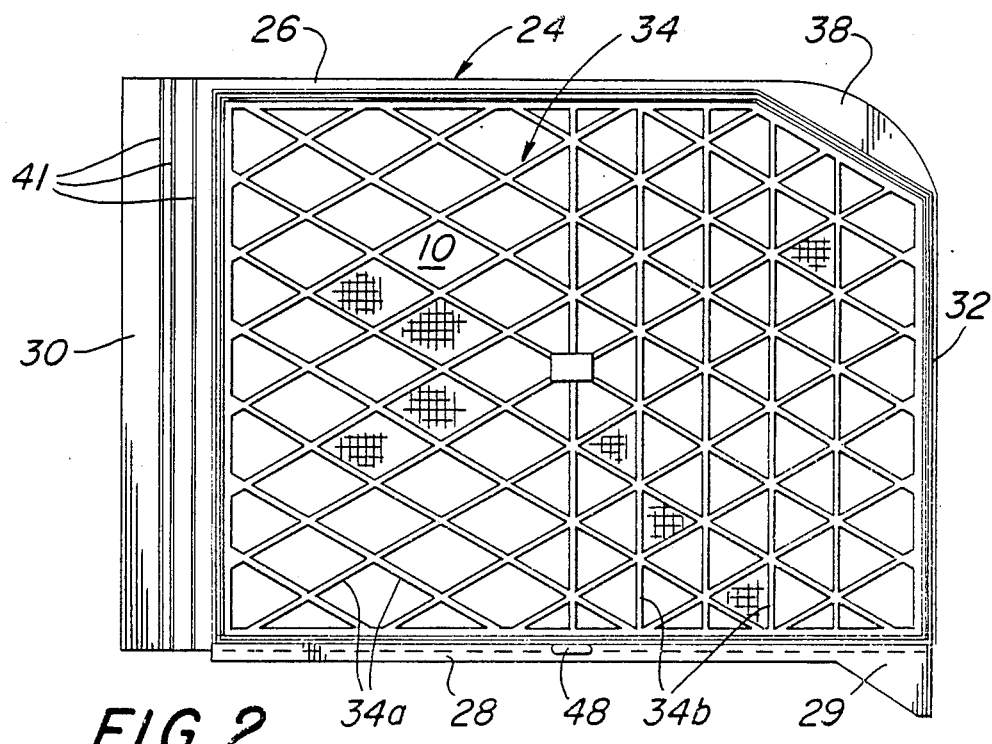
FIG. 2 is an enlarged view of the assembly of FIG. 1 prior to being cropped.
Figure 3:
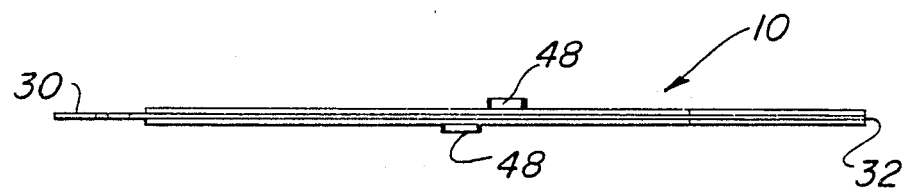
FIG. 3 is a top view of the assembly of FIG. 2.

Referring also to FIGS. 2, 3 and 4, assembly 10 includes a continuous frame 24 of top, bottom, front and rear tenons 26, 28, 30 and 32, respectively. Attached to frame 24 is a lattice 34 of diagonally crossed strips 34a within the entire enclosed area and vertically spaced strips 34b within the rear half of the enclosed area, each vertical strip 34b being in line with a column of intersection of crossing strips 34a. Frame 24 and lattice 34 are preferably molded as one piece of strong and durable plastic, but with sufficient flexibility to permit the screen assembly 10 to be bent slightly, if necessary, along its width for snapping the peripheral extremities of front and rear tenons 30 and 32 into the tracks of vent post 14 and rear door member 22. In most installations assembly 10 can be inserted without bending by first sliding the front tenon 30 forward deep into the track of vent post 14 and then sliding it back slightly into the track of door member 22. The thickness of frame tenons 26, 30 and 32 at their extremities is equal to ro slightly less than the thickness of windowpane 17 in order to slide with ease into the tracks of post 14 and door members 20 and 22. Frame 24 is rounded at the peripheral junction 38 of tenons 26 and 32 to substantially conform to the track curvature in the upper rear corner of window opening 16.

Figure 7:
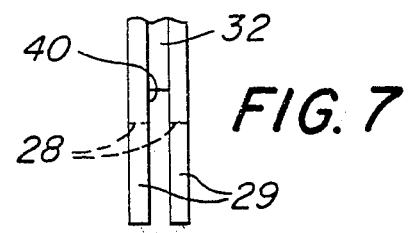
FIG. 7 is an enlarged side view of the lower rear corner of the assembly.

As best illustrated in FIG. 4, the perimeter of bottom margin 28 includes an inverted channel 40 of sufficient width to closely fit over the top of windowpane 17, and of sufficient depth to receive windowpane 17 along its entire length including the upper perimeter at the rounded corner of windowpane 17. A bifurcated extension 29 (FIGS. 2 and 7) at the rear portion of bottom margin 28 provides the extra area needed to seal any crack along the lower perimeter of the round corner of windowpane 17.

Figure 6:
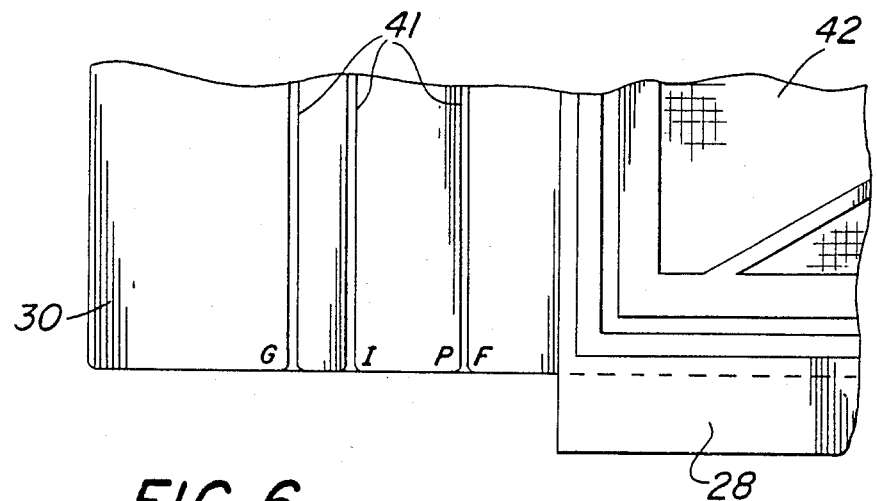
FIG. 6 is an enlarged view of a lower left portion of the assembly as shown in FIG. 2.

So that assembly 10 may be used in a variety of vehicle windows, its overall height including bifurcated extension 29 is less than the corresponding height of any vehicle window opening in which its use is intended. Conversely, the overall width of the assembly 10 is greater than the corresponding width of such window opening; and the width from the distal side of rear tenon 32 to the proximal side of front margin 30 is less than the corresponding width of such window opening. In situations where the height of the windown opneing is greater than assembly 10, the windowpane 17 is simply adjusted upward; and where the width of the window opening is less than the width of assembly 10, front tenon 30 is cut off an amount sufficient to allow assembly 10 to fit slidably in the tracks of vent post 14 and rear member 22. An actual assembly manufactured according to the invention measures 17½" high (including a 2"high×3" long extension 29), 22¼" wide, and a radius of 3" at corner junction 38. The width provides a 3⅛" front tenon 30 for cropping. As best seen in FIG. 6, tenon 30 includes guide lines of grooves or scores 41 parallel to the edge of member 30 at distances from the extremity of rear margin 32 corresponding to the widths of window openings in several typical trucks. In the aforementioned actual assembly, three lines labeled G, I and P-F are provided at 20¾", 20⅜" and 19⅝" from the edge of rear tenon 32, and correspond respectively to window openings for specific truck models under trademarks GMC, International, Peter Built or Freightliner.

The opening bounded by frame 24 is covered by an insect screen 42 as of wire, plastic, or cloth mesh. As illustrated in FIGS. 4 and 5, frame 24 includes continuous channels 44a and 44b symmetrically disposed on the opposite sides. The perimeter of screen 42 is secured in either channel by compression together with an elastic piping 46. In the illustrated embodiment of assembly 10 for the window in left door 12, screen 42 is secured in channel 44a on the left side in FIGS. 4 and 5 in order that screen 42 is disposed, relative to the lattice 34, on the inside of the truck cab. For the corresponding right side window, screen 42 would be secured in channel 44b (the right side FIGS. 4 and 5) so that it is similarly disposed inside the cab.

Frame 24 also includes centrally located bosses 48 projecting from either side of bottom member 28 for gripping with the fingers when installing and removing assembly 10.

The preferred method for installing and removing a window screen assembly 10 on either side window is summarized as follows. Measure the width of the window opening from the vehicle's vent post 14 to the rear margin 22 in the door and add a small amount, such as ¼ or more for the aforementioned actual assembly, for the depth of the window tracks. Cut frame tenon 30 on a line of equal distance from the edge of frame tenon 32 and smooth away the rough edges. If one of the guide lines 41 is tenon 30 corresponds to the vehicle model to which assembly 10 is being fitted, no measurements are necessary; simply cut member 30 at the appropriate line. With windowpane 17 fully lowered, and screen 42 on the side of lattice 34 facing inside the vehicle, front tenon 30 of frame 24 is slid forwardly in the track of vent post 14 and then slid rearwardly and upwardly until both tenons 30 and 32 are engaged in the window tracks. In instances where the track of post 14 is shallow, the width of frame 24 may be cut to closer tolerance and bent to allow the front and rear tenons 30 and 32 to snap into the side tracks. Holding frame 24 in position by boss 48, windowpane 17 is then raised and seated in channel 40 in the bottom margin 28. If the vehicle is equipped with power windows, it is especially important to raise the window very carefully and keep the fingers free from the top and bottom tracks. With an excess of front margin 30, the frame 24 can be laterally adjusted rearwardly to seal any crank in the rounded corner areas. The assembly 10 is removed simply by lowering the window and sliding or snapping frame 24 out of the window tracks.

Some of the many advantages and novel features of the invention should now be readily apparent. For example, a vheicle window screen assembly is provided which can be quickly and easily installed to provide a high degree of personal privacy and security from intruders. The frame and lattice supporting the insect screen can be formed for both left and right side windows from a single mold. The assembly may be produced in only a few sizes, each size being readily adaptable to a wide range of different window sizes. The frame and lattice may be formed of a strong but slightly flexible, durable plastic highly resistant to breaking.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:

1. A screen assembly adaptable to a plurality of vehicle window openings of different widths, each of the openings having a windowpane slidable in tracks within the front and rear sides and the top thereof, the track portion around the upper rear corner of each opening being arcuate, comprising in combination frame means having top, front and rear tenons, an arcuate upper rear corner formed to slide congruently in the corresponding adjacent tracks, and a bottom channel formed to straddle the top of the windowpane, said bottom channel having a depending extension adjacent to said rear tenon for occluding any opening over the rear corner of the windowpane, only said front tenon bearing a plurality of parallel guidelines of grooves or scores defining removable portions, the distance of each groove or score from the outer boundary of said rear tenon corresponding to the width of respective ones of the plurality of window openings for enabling the width of said frame means to be trimmed to conform to the width of a selected one of the plurality of window openings, said removable portion prior to being trimmed having an edge extending between said top tenon and said bottom channel and being located farther from the inner boundary of said frame means than said top and rear tenons and said bottom channel; and a mesh screen secured around the perimeter thereof to said frame means.

2. A screen assembly according to claim 1 further comprising:
   a lattice means secured to, and extending across the area enclosed by, said frame means;
   continuous recesses formed on opposite sides and around the inner border of said frame means, one of said recesses contiguously receiving said screen along the entire length thereof; and
   an elastic piping disposed along the perimeter of said screen compressing said screen into said one recess.

3. A screen assembly suitable for fitting in window openings of various widths on either side of a vehicle, each of said openings having a substantially vertically slidable windowpane in front and rear side tracks, comprising:
   a window screen secured to a frame having top and bottom margins and front and rear side margins for connecting to the periphery of a selected one of said openings and only said front margin having an excess width for enabling the width of said frame to be trimmed to conform to the width of the selected window opening;
   a lattice means secured to, and extending across the area enclosed by, said frame means;
   continuous recesses integrally formed on opposite sides and around the inner border of said frame for receiving said screen, a selected one of said recesses contiguously receiving said screen; and
   an elastic piping disposed along the perimeter of said screen compressing said screen into said one recess along the entire length thereof.

4. A screen assembly adaptable to a plurality of vehicle window openings of different widths, each of the openings having a windowpane slidable in a congruent track within the front and rear sides and the top of each opening, the track portion along the front side being upright and rectilinear and arcuate around the upper rear corner of the opening, comprising in combination:
   frame means having top and rear tenons forming an arcuate upper rear edge and preformed to slide congruently in the corresponding adjacent track, a front tenon preformed with a removable portion along a rectilinear edge for trimming the front edge to slide congruently in the track portion along the front side of the opening, said removable portion bearing a plurality of guide lines of grooves or scores parallel to the front edge distances from said rear tenon corresponding to the width of respective ones of the plurality of window openings, and a bottom member including a channel preformed to straddle the top of the windowpane, said bottom member also having an extension below said channel at the end opposite from said front tenon, said extension being formed to occlude any opening over the upper rear corner of the windowpane; and
   a mesh screen secured around the perimeter thereof to said frame means;
   whereby the entire perimeter of said frame means is contiguous with a selected one of the plurality of openings.

5. A screen assembly adaptable to a plurality of window openings of different widths on either side of a vehicle, each of the openings having a windowpane slidable in a congruent track within the front and rear sides and the top of each opening, the track portion along the front side being upright and rectilinear and arcuate around the upper rear corner of the opening, comprising in combination:
   frame means having top and rear tenons preformed to slide congruently in the corresponding adjacent track, a front tenon preformed with a removable portion along a rectilinear edge for trimming the front edge of slide congruently in the track portion along the front side of the opening, said removable portion having a plurality of guidelines of grooves or scores extending parallel to one another and to said edge, and a bottom member including a channel preformed to straddle the top of the windowpane, said bottom member having an extension at the end opposite from said front tenon depending below said channel and formed to occlude any opening over the upper rear corner of the windowpane;
   a mesh screen secured around the perimeter thereof to said frame means;
   a lattice means secured to and extending across the area enclosed by said frame means;
   continuous recesses integrally formed symmetrically around the inner border of said frame means on opposite sides thereof, a selected one of said recesses contiguously receiving said screen; and
   an elastic piping disposed along the perimeter of said screen compressing said screen into the selected one of said recesses;
   whereby the entire perimeter of said frame means is contiguous with a selected one of the plurality of openings.

6. A screen assembly adaptable to a plurality of window openings of different widths on either side of a vehicle, each of the openings having a windowpane slidable in tracks within the front and rear sides and the top thereof, comprising in combination:
   a frame having top, front and rear tenons formed to slide in the corresponding adjacent tracks and a bottom channel formed to straddle the top of the windowpane, only said front tenon carrying a removable portion for conforming the width of said frame to the width of a selected one of the plurality of window openings, said front tenon extending between said top tenon and said bottom channel, each side of said frame further including a continuous recess integrally formed around the inner border thereof; and
   a mesh screen secured around the perimeter thereof to said frame within one of said continuous recesses;
   whereby the assembly can be readily sized and installed in a window opening of a selected side of the vehicle.

* * * * *